Patented Jan. 29, 1952

2,583,619

UNITED STATES PATENT OFFICE 2,583,619

PREPARATION OF A RANEY CATALYST SURFACE

Philip C. White, Flossmoor, Ill., assignor to Standard Oil Company, Chicago, Ill., a corporation of Indiana No Drawing. Application March 15, 1944, Serial No. 526,661

2 Claims. (Cl. 252—477)

This invention relates to the preparation of a catalytic surface in improved heat transfer relation to a cooling medium. More particularly my invention pertains to the catalytic reduction of carbon oxides for the production of hydrocarbons and oxygenated hydrocarbons having more than one carbon atom to the molecule.

The production of hydrocarbons by the catalytic reduction of carbon oxides is highly exothermic and a major problem is the dissipation of the heat of reaction. Liquid hydrocarbons within the motor fuel range can be produced by contacting carbon monoxide and hydrogen over cobalt or nickel catalyst if the temperature is maintained at between about 350 and about 425° F. However, if the temperature is permitted to rise substantially above this range excessive quantities of gaseous products, such as methane, are produced whereas at substantially lower temperatures little reaction of any kind occurs. The reduction of carbon oxides liberates about 75,000 B. t. u. for every 1000 cubic feet of gas mixture reacted and substantially all of this heat must be removed by indirect heat transfer in order to maintain the temperature within the narrow limits required. Heretofore heat transfer for removal of these large amounts of heat has been from the catalyst surface through the gas phase to the metal wall. The present invention has to do with an improved heat transfer means in the above process wherein the catalyst is in metal-to-metal heat conductive contact with the metal wall and heat transfer through the gas phase is eliminated.

Therefore, one of the objects of my invention is to provide a method and means for controlling the temperature of highly exothermic catalytic gas reactions within desired limits. A further object is to provide an improved method and means for transferring heat from an exothermic reaction zone with a minimum of heat exchange equipment. Another object is to provide a highly active catalytic surface in direct heat exchange relation with a cooling medium. An additional object is to provide a method and means for preparing a supported catalyst particularly adaptable to my temperature control system. These and other objects of my invention will become apparent as the description thereof proceeds.

According to my invention hydrocarbon synthesis is effected over a catalyst prepared by alloying the surface of a catalytic metal cooling member with silicon or aluminum to a depth of between about .015 and about .125 inch and leaching out the soluble silicon or aluminum with an alkali solution to leave an active catalytic skeleton on the surface of the cooling member. This active skeleton is in perfect heat transfer relation with the cooling medium which is circulated in contact with the cooling member. The surface alloyed by this means can be the outside or inside of a tube or one side of a sheet. It is also within the scope of my invention to prepare an alloy of catalytic and soluble metals per se for subsequent application to the cooling member. Such a surface can be applied by spraying an atomized molten alloy, by powdering the alloy and applying it to the desired surface, by preforming a sleeve and heat shrinking or expanding it onto a tube or by putting down a thin coating by employing a weld rod of the alloy. The specific means of providing an alloy on a cooling member are known and will not be described in greater detail.

The simplest form of an alloy consists of two components. One is the catalytic material and the other is a substance that may be removed by a suitable reagent either by chemical action or physical solution which reagent will not attack the catalytic material to the same extent. Both the catalytic material and the removable material may comprise more than one metal. Thus more complex alloys are made with two or more metals (such as Ni+Co) comprising the catalytic portion. The removable portion is conveniently either aluminum or silicon or mixtures of the two. Aluminum, in particular, has the property of readily mixing with a number of catalytic metals such as nickel, cobalt, copper, and silver to form alloys having proper characteristics for the production of catalysts.

The preferred range of alloy composition is between about 35 and 65 weight per cent of removable metal. The optimum weight ratio of removable metal to catalytic metal or metals in the surface skeleton is about one to one. The weight per cent range of 35 to 65 weight per cent corresponds approximately to the nickel- or cobalt-aluminum or silicon alloy compositions having 2, 3 or 5 molecules of aluminum or silicon for each molecule of nickel or cobalt. The compound Ni·Al is only slightly soluble in caustic and this alloy is not of particular utility where extensive leaching and washing are essential to attain the desired degree of activity. The optimum alloy, however, appears to be nickel-aluminum or silicon, cobalt-aluminum or silicon or nickel-cobalt-aluminum or silicon compositions having three molecules of the removable metal for each molecule of the catalytic material. These compositions correspond to about 42% catalytic metal and about 58% soluble metal by weight.

The removable alloying metal can be applied to a metal surface by any type of pressure spraying device which is adapted to spray the alloying metal in a molten state onto the surface of the vessel or conduit, or by dipping the surface into molten metal, or filling tube with molten metal preferably while the vessel is at an elevated temperature between about 750 and about 1500° F. The aluminum may be applied either in a molten or in a powdered form and it readily alloys with the catalytic metal surface if the vessel or conduit is maintained at a temperature of between about 900 and about 1100° F. The soluble metal contacts the surface and fusion between the two takes place. If desired a flux may be used to aid fusion between the removable alloying metal and the catalytic metal. The removable metal penetrates the metal and alloys therewith to form an integral surface coating. Removable metal can also be applied in the form of a powder or foil while a vessel is being rolled to aid in the fusion of the removable metal with the catalytic metal.

In another embodiment the alloy is prepared before being applied to the cooling surface, metallic nickel and/or cobalt and metallic silicon and/or aluminum in proper portions being fused together. If desired, the catalytic metal is melted and the metallic silicon or aluminum alloyed therewith. The two elements may be fused separately and then commingled or fused in the same melt. One convenient way of preparing the alloy is to place the two metals in the desired proportions in a covered graphite crucible and heating the mixture to the melting point. The fused alloy as such or a powdered alloy obtained by cooling and grinding the alloy, can be applied to the cooling surface by any of the techniques described above in connection with the application of the removable metal alone.

However prepared, the alloy surface of removable metal and catalytic metal is treated with a suitable reagent for removal of the aluminum or silicon. The reagent may be of any desired strength depending upon the extent to which it is desired to remove the soluble metal. A suitable reagent is an aqueous sodium hydroxide solution which forms sodium silicate or sodium aluminate which is washed from the surface. It is contemplated, however, that other reagents may be used which attack the silicon or aluminum and not the nickel or cobalt. A 20% solution of an alkali hydroxide is useful, but in general 10 to 50% aqueous solutions of alkali can be utilized. The leaching of the catalyst surface with the reagent for the aluminum or silicon can be effected, for example, at a temperature of between about 245 and 250° F. for a time of about two hours or more when a 20% solution of sodium hydroxide is used. Reflux conditions can be used and it will be apparent that the time of leaching can be altered to control the depth of the active skeleton. After treating the alloy surface with the reagent for the removable constituent of the alloy, the surface is washed free from reagent, ordinarily with cold water, although hot water may be employed, for example, at a temperature of about 245 to 250° F. under pressure. After washing, the catalyst is ready for use without further treatment. The leached catalytic skeleton, however, can be activated further by treatment with hydrogen, for example.

In some instances an activated iron skeleton surface is useful in the synthesis of hydrocarbons, particularly at higher temperatures and pressures. Such an alloy may be prepared by applying an iron-zinc alloy to a cooling surface as, for example, by dipping the apparatus into a molten iron-zinc alloy or by applying the alloy in the form of a powder. It is, however, possible to produce the coatings of iron-zinc alloy by the action of zinc or zinc vapor directly on the iron or steel surface. Likewise an iron apparatus to be coated with the zinc alloy may be coated with zinc powder and heated, preferably at temperatures between about 750 and 1500° F. The zinc may then be dissolved from the alloy surface to produce an iron skeleton. The skeleton can also be prepared by a mild oxidation of the zinc in the alloy with subsequent leaching of the zinc oxide to produce the skeleton. This oxidation-leaching sequence can be repeated as many times as necessary to obtain the depth of skeleton desired.

The zinc metal can be leached out by the use of suitable acid such as acetic acid or an alkali, and the oxide is soluble in mineral acids, dilute acetic acid or ammonium hydroxide. The treatment of the skeleton with the acid or alkaline solutions should be followed with rather copious water washing. The skeleton can also be further activated by treatment with hydrogen or by alternate oxidation and reduction treatments.

While my invention has more general applications, it is particularly useful in the synthesis of liquid hydrocarbons from a mixture of carbon oxides and hydrogen. Therefore, in the following description the invention will be described with respect to the formation of liquid hydrocarbons from carbon monoxide and hydrogen in the presence of the catalyst in accordance with my invention.

The feed gases comprising oxides of carbon and hydrogen are passed through the catalytic reaction zone under temperature and pressure conditions adapted to produce hydrocarbons containing more than one carbon atom to the molecule. The feed gases can comprise, for example, hydrogen and carbon monoxide in the ratios of between about 3 and about 0.5 to one. In general, it is preferred to maintain a temperature in the range of 300 to 425° F. with a cobalt or nickel catalyst, but temperatures within the range of 300 and 650° F. can be used with other catalysts. By conducting the operation in accordance with the present process the entire quantity of heat of the exothermic reaction is removed through the tube wall and is absorbed in a cooling medium flowing through a cooling jacket or tank surrounding the reaction zone. A pressure of between about one and 20 atmospheres or even higher, for example, 1000 atmospheres, may be used. The feed gases may be fed at a rate of between about 1.0 to about 100 cu. ft. per hour per sq. foot of active surface. The feed can be passed over the catalytic surface, situated on the inside or outside of tubes, or on a plane surface, a fluid cooling medium being passed either concurrently or countercurrently on the other side of the metal support. If desired part of the separated hydrocarbon or water reaction products can be used as the cooling medium.

Unreacted gases can be separated and recycled to the reaction zone with fresh feed or can be returned separately at spaced points along the reactor. Alternatively the recycled gases can be fed through the reactor with spaced injection of carbon monoxide, hydrogen or mixtures thereof.

By employing my invention the rate of heat removal per unit volume of catalyst and unit area of cooling surface is far greater than when using conventional beds of individual catalyst particles. Therefore, it is possible to increase the rate of oil formation from a given volume of catalyst many-fold, since heat removal is the limiting factor in the reduction of carbon monoxide. This in turn means greater gas throughput and oil production from a given size plant, or smaller plant for a given oil producing capacity. Also the temperature control problem is simplified and the efficiency of the process is improved.

It will be understood that the details and examples hereinbefore set forth are for the purposes of illustration only and that my invention is defined by the following claims:

I claim:

1. The method of preparing a conversion chamber having catalytically active heat-exchange surfaces for promoting synthesis of exothermic reaction of hydrogen with carbon monoxide and wherein heat is transferred from said catalytic surfaces through a gas impermeable metal wall to a cooling medium which method comprises producing an alloy layer on the reaction zone side of a catalyst-forming metal chamber fabricated of at least one metal of the class consisting of iron, cobalt and nickel to a thickness in the range of about 0.015 to 0.125 inch with an alloying element of the class consisting of silicon, aluminum, and zinc, said alloy layer consisting of between about 35 to 65 weight per cent of the alloying element, leaching the alloy layer with an aqueous solvent which will dissolve the alloying element but not the catalyst-forming metal to remove the alloying element and leave the catalyst forming metal in the form of a fixed skeleton layer integrally bonded to the reaction zone side of the gas impermeable metal chamber, and activating the fixed catalyst skeleton by treatment with hydrogen.

2. The method of preparing catalytically active heat-exchange surfaces for promoting synthesis by exothermic reaction of hydrogen with carbon monoxide in a conversion zone wherein heat may be transferred from said catalytic surfaces through a gas-impermeable metal wall to a cooling medium which method comprises alloying an iron wall to a thickness in the range of about 0.015 to 0.125 inch with about 35 to 65 weight per cent zinc to form an integrally bonded alloy layer on the surface of said metal wall, leaching the integrally bonded alloy layer with an aqueous solvent which will dissolve the zinc but not the iron to remove the alloying zinc and leave the catalyst-forming iron metal in the form of a fixed skeleton layer integrally bonded to the reaction zone side of the gas-impermeable metal wall, and activating the fixed catalyst skeleton by treatment with hydrogen.

PHILIP C. WHITE.

REFERENCES CITED

The following references are of record in the file of this patent:

UNITED STATES PATENTS

| Number | Name | Date |
|---|---|---|
| 1,043,580 | Eldred | Nov. 5, 1912 |
| 1,628,190 | Raney | May 10, 1927 |
| 1,685,759 | Walter | Sept. 25, 1928 |
| 1,940,934 | Bennett et al. | Dec. 26, 1933 |
| 2,034,715 | Dreyfus | Mar. 24, 1936 |
| 2,042,451 | Bond et al. | June 2, 1936 |
| 2,149,515 | Fischer | Mar. 7, 1939 |
| 2,166,183 | Signaigo | July 18, 1939 |
| 2,257,800 | Howk | Oct. 7, 1941 |

FOREIGN PATENTS

| Number | Country | Date |
|---|---|---|
| 282,112 | Great Britain | Dec. 13, 1927 |

OTHER REFERENCES

Ellis: Chemistry of Petroleum Derivatives, vol. II, pgs. 1231–1232, Reinhold (1937).

Chemical Abstracts, vol. 32, pg. 1688 (1938).

Chemical Abstracts, vol. 33, pgs. 1660–61 (1939).

Chemical Abstracts, vol. 34, pg. 7554 (1940).

Ser. No. 357,989, Brendlein (A. P. C.), published May 25, 1943.